Aug. 12, 1947. A. T. LARSON 2,425,625
PREPARATION OF HYDROGEN
Filed Sept. 11, 1943
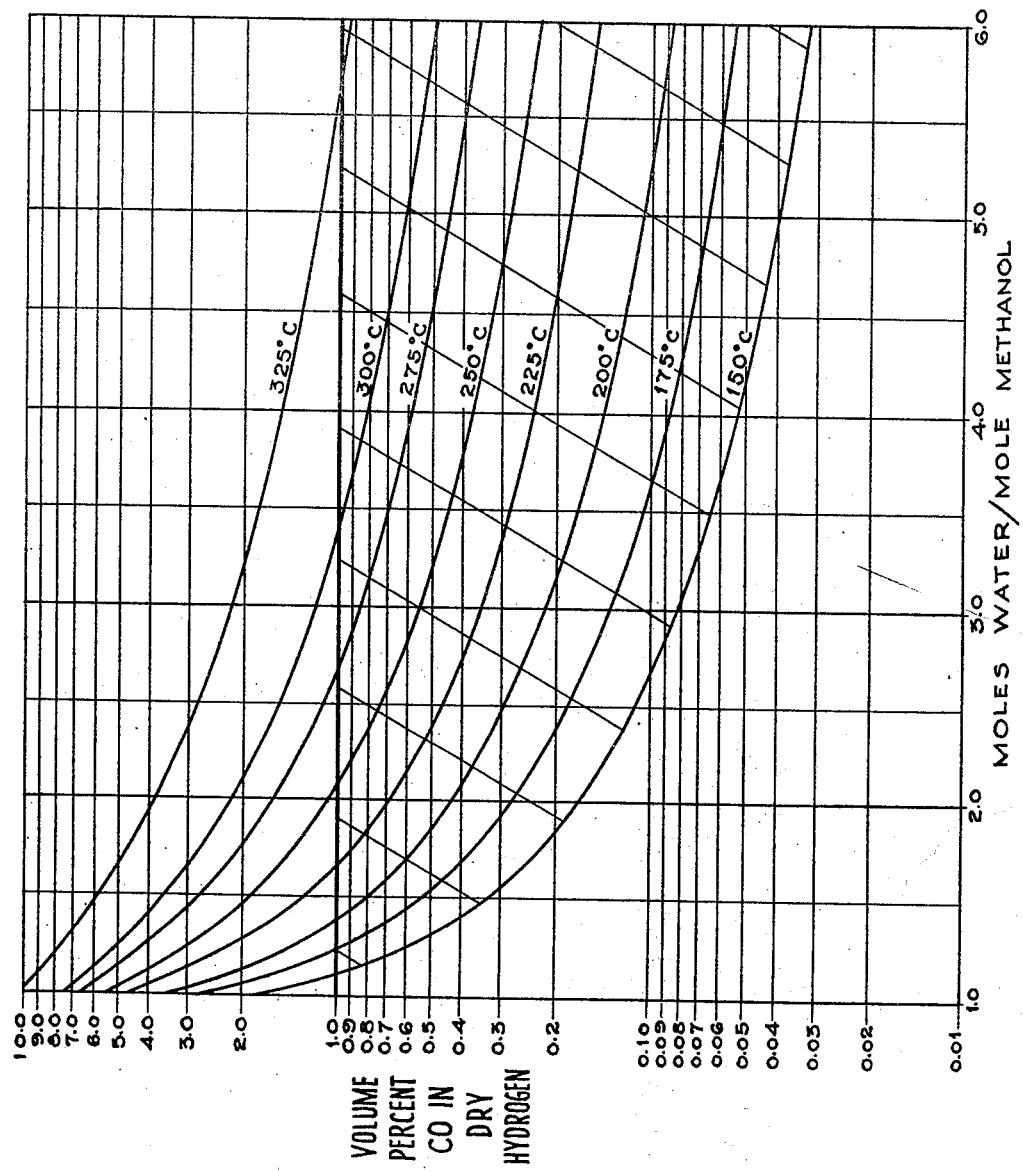
Alfred T. Larson INVENTOR.
BY
ATTORNEY Patented Aug. 12, 1947

2,425,625

UNITED STATES PATENT OFFICE 2,425,625

PREPARATION OF HYDROGEN

Alfred T. Larson, Wilmington, Del., assignor to E. I. du Pont de Nemours & Company, Wilmington, Del., a corporation of Delaware Application September 11, 1943, Serial No. 501,914

5 Claims. (Cl. 23—212)

This invention relates to a process for the preparation of hydrogen and more particularly to its preparation from methanol and water.

Considerable investigational work has been carried out on the synthesis of methanol from carbon monoxide and hydrogen, as well as on the reverse reaction, the decomposition of methanol to hydrogen and carbon monoxide. These processes, (involving on the one hand, the preparation of methanol, and on the other, its decomposition to reducing gases) have been studied principally to acquire a more thorough insight into the exact mechanism of the methanol synthesis with little or no consideration given to the problem of providing hydrogen by the reverse reaction, from methanol.

An object of the present invention is to provide a process for the preparation of hydrogen. Another object is to provide a process for the preparation of hydrogen in large volume from methanol and water. Yet another object is to provide suitable catalysts and reaction conditions for converting methanol and water to carbon dioxide and hydrogen, substantially free from carbon monoxide, from which gaseous mixture the carbon dioxide may be removed leaving substantially pure hydrogen. Other objects and advantages of the invention will hereinafter appear.

The above objects are accomplished in accord with this invention by a process in which 50% more hydrogen is produced from methanol than is produced by the cracking of methanol according to the process of the art, i. e. the process conducted in accord with the equation:

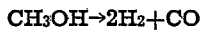
$$CH_3OH \rightarrow 2H_2 + CO$$

By the process of the invention methanol is reacted with water in the presence of a suitable catalyst the reaction being illustrated by the equation:

$$(CH_3OH + H_2O \rightarrow 3H_2 + CO_2)$$

All of the hydrogen of the methanol and the water is recoverable in the process as molecular hydrogen and the carbon dioxide can be readily separated from the resulting mixture by a suitable washing or scrubbing operation. It is possible, by means of this process, to set up economical, relatively lightweight equipment which can be operated with simplicity to develop in fixed or mobile units a practical process for the preparation of hydrogen at the point where it is to be used.

In addition to the aforesaid advantages the gaseous product of the invention contains, as the major contaminant, carbon dioxide which can be easily separated from the hydrogen. This is in further contradistinction to the methanol-cracking process of the art the product of which contains as the corresponding contaminant carbon monoxide, a gas more difficult to separate and dangerous to handle.

In accord with the invention, the reaction is conducted by passing vaporized methanol and steam over a fixed cataylst disposed in a reaction converter under suitable temperature and pressure conditions, the methanol and steam passing over the catalyst at a space velocity between 200 and 5000, and preferably at a space velocity between 750 to 1500. (The space velocity being measured as the volume of a gas under standard conditions of temperature and pressure flowing per hour over a unit volume of the catalyst.)

The reaction may be conducted over a wide range of temperature but is preferably conducted at a temperature between 150 and 350° C., while for low carbon monoxide gas contact temperatures between 250 and 325° C. are recommended. Pressures may be employed, if desired, ranging from 5 atmospheres upwards to 500 atmospheres or higher.

The ratio of methanol to water may vary over wide limits outside the mole per mole ratio required by stoichiometric considerations and it has been found that, for all practical purposes, the ratio may range from 1.5 to 6 moles of water per mole of methanol.

Carbon monoxide is present in the reaction product and its presence is governed inter alia by the amount of water introduced with the methanol. In the accompanying logarithmic graph, which has been constructed from equilibrium data, there is shown as abscissa the volume percent of carbon monoxide in dry hydrogen and as ordinates the moles of water per mole of methanol. It will be noted that if, on this basis, the water to methanol is approximately 1:1, there will be present in the hydrogen approximately 3.5% carbon monoxide if the reaction is carried out at a temperature of 200° C., while better than 10% carbon monoxide is present if the reaction is carried out at a temperature above 325° C. Similarly, if on the same basis a 3:1 ratio is used at 200° C., carbon monoxide will be present in the hydrogen to the extent of approximately 0.22%, while at 325° C. it is present to the extent of approximately 2.1%. As the mole ratio of water to methanol increases, it will thus be seen that the amount of carbon monoxide in the resulting gas decreases. It is desired to maintain the amount of carbon monoxide at less than 1%, the reaction is preferably conducted under the conditions called for by the shaded area of the graph.

As has been stated, the temperature of the reaction is preferably held between 250 and 325° C. and when the reaction is conducted within this temperature range and under approximately atmospheric pressure it will be appreciated that in order to restrict the carbon monoxide content below 1% with a feed of 1½ moles of water per mole of methanol the temperature should range between 200 and approximately 210° C. while with a feed of 6 moles of water per mole of methanol the temperature may range between 200 and 300° C., the lower temperature within the range giving a lower volume per cent of carbon monoxide in dry hydrogen.

Care should be exercised in the purity of the methanol used in the reaction. If it contains appreciable amounts of impurities such, for example, as ethanol or higher molecular weight alcohols a rapid poisoning of the catalyst occurs which quickly destroys its activity. This poisoning effect is quickly apparent even with concentrations of impurities as low as 0.05%.

The catalysts which are suitable for the reaction include catalysts obtained by the coprecipitation of copper and zinc oxides, or chromates, fused copper and zinc oxide with or without chromium oxide or copper-zinc alloys such as brass. Copper-manganese catalysts may likewise be employed, although preferably, it has been found that a coprecipitated catalyst gives substantially equilibrium conversions of the methanol and water employed to hydrogen. Catalysts especially well adapted for the reaction are here illustrated by examples, although, as stated, other catalysts such as those described above may be used:

I. Zinc sulfate and copper sulfate in a molar ratio of 2:1 are dissolved in water, precipitated with an alkali such as sodium carbonate or ammonium carbonate, the precipitate filtered, washed and ignited. The dried precipitate is then pulverized thoroughly, dried and reduced with hydrogen prior to or during the reaction. In the claims this catalyst is referred to as a zinc-copper containing catalyst.

II. A mixture containing zinc sulfate and copper sulfate in a molar ratio of 2:1 is dissolved in water and an excess of chromium acid added to the extent of about 4 to 6 moles. After a thorough solution with stirring, a precipitate is formed by the addition of ammonia, the precipitate is filtered off, washed, dried and ignited prior to use. In the claims this catalyst is referred to as a zinc-copper-chromium containing catalyst.

The gases issuing from the reaction may be scrubbed in any suitable manner for the removal of the carbon dioxide and it has been found, for example, that an aqueous solution containing from 10 to 40% monoethanolamine will effectively remove substantially all of the carbon dioxide from the hydrogen, leaving a substantially pure hydrogen gas containing very low percentage of heavier gases. Other scrubbing liquids may be used, however, e. g. aqueous caustic, aqueous hydrated lime, etc.

Examples will now be given illustrating preferred embodiments of the invention in which parts are by weight unless otherwise indicated.

*Example.*—A tubular converter is first charged with the prepared catalyst, reduced or unreduced, on a layer about one inch thick of ignited quartz. A similar layer of quartz is placed on top of the catalyst. If desired a layer of copper wool of similar depth may underlay the lower layer of quartz. If a catalyst such as I is to be reduced in situ the heat of reduction is so high that the reduction should proceed slowly and it has been found desirable to reduce the catalyst at a temperature of about 250° C. with a vapor containing water and 0.5-2.0% by weight of methanol, the reduction being continued until the evolution of $CO_2$ indicates substantial quantitative conversion of the methanol to $3H_2$ and $CO_2$, that is, the discharged gas is about 25% $CO_2$.

The carbon dioxide is removed from the gas by scrubbing with a 30% (5N) aqueous monoethanolamine solution in a column filled with ½" stoneware Raschig rings. The monoethanolamine solution being very basic absorbs carbon dioxide readily and, as the amine carbonates formed can be decomposed readily by heating, the methanol solution charged with the amine carbonates can be removed from the column and readily freed from carbon dioxide by heating. The regenerated scrubbing liquid may be returned to the column for reuse. Inasmuch as the use of pressure in the order of 25 to 150 pounds per square inch or more increases the boiling point of the solution, thereby causing greater dissociation of the amine carbonates and greater carbon dioxide removal, it is advisable to conduct the regeneration under pressure.

The table which follows illustrates the use of a converter so charged, in the process of the invention.

| Run | Hydrogen Space Velocity | $H_2O$ $CH_3OH$ Mole Ratio | Catalyst | Temperature of Preheat, °C. | Reaction Temperature | Orsat. $CO_2$ | Analysis CO | Conversion |
|---|---|---|---|---|---|---|---|---|
| A | 1,000 | 3/1 | I[1] | 341 | 300–400 | 24.2 | 0.6 | 98 |
| B | 1,000 | 3/1 | II | 370 | 252–268 | 23.6 | 0.49 | 100 |
| C | 900 | 3/1 | II | 358 | 259–284 | 24.5 | 0.74 | 98 |
| D | 1,125 | 3/1 | II | 329 | 294–316 | 24.8 | 0.9 | 94 |
| E | 750 | 4/1 | II | 352 | 292–302 | 24.8 | 0.6 | 91+ |
| F | 1,000 | 3/1 | I | 326 | 219–305 | 24.8 | 0.6 | 100 |

[1] I designates copper-zinc catalyst, II designates copper-zinc-chromium catalyst.

I claim:

1. In a process for the preparation of a gaseous mixture containing hydrogen and less than 1% carbon monoxide the steps which comprise catalytically reacting water and methanol in the presence of a catalyst selected from the group consisting of zinc-copper and zinc-copper-chromium containing catalysts under conditions ranging between a molar ratio of water to methanol of 1.8:1 at a temperature less than 200° C. to a molar ratio of 6:1 at a temperature less than 330° C.

2. In a process for the preparation of a gaseous mixture containing hydrogen and less than 1% carbon monoxide the steps which comprise catalytically reacting water and methanol having a ratio of water to methanol of approximately 3:1 on a molar basis in the presence of a catalyst selected from the group consisting of zinc-copper and zinc-copper-chromium containing catalysts and conducting the reaction at a temperature of approximately 285° C.

3. In a process for the preparation of a gaseous mixture containing hydrogen and less than 1% carbon monoxide the steps which comprise reacting water and methanol under conditions ranging between a molar ratio of water to methanol of 1.8:1 at a temperature less than 200° C., to a molar ratio of 6:1 at a temperature less than 330° C. in the presence of zinc-copper containing catalyst.

4. In a process for the preparation of a gaseous mixture containing hydrogen and less than 1% carbon monoxide the steps which comprise reacting water and methanol having a ratio of water to methanol of approximately 3:1 on a molar basis and conducting the reaction at a temperature of approximately 285° C. in the presence of a zinc-copper-chromium containing catalyst.

5. In a process for the preparation of a gaseous mixture containing hydrogen and less than 1% carbon monoxide the steps which comprise catalytically reacting water and methanol in the presence of a catalyst selected from the group consisting of zinc-copper and zinc-copper-chromium containing catalysts under conditions ranging between a molar ratio of water to methanol of 1.1:1 at a temperature above 150° C. to a molar ratio of 6:1 at a temperature less than 330° C.

ALFRED T. LARSON.

REFERENCES CITED

The following references are of record in the file of this patent:

UNITED STATES PATENTS

| Number | Name | Date |
|---|---|---|
| 1,797,426 | Larson | Mar. 24, 1931 |
| 1,809,978 | Larson | June 16, 1931 |
| 2,013,066 | Porter | Sept. 3, 1935 |
| 1,783,901 | Bottoms | Dec. 2, 1930 |

OTHER REFERENCES

"Industrial and Engineering Chemistry," vol. 20, pp. 694–698 (1928).

"Industrial and Engineering Chemistry," vol. 21, pp. 1052–1055 (1929).

Riegel, "Industrial Chemistry," 4th edition, pp. 321–322.

"Journal of the American Chemical Society," vol. 43, pp. 1670–1672 (1921).